United States Patent [19]

Hoffman et al.

[11] 4,244,132

[45] Jan. 13, 1981

[54] FISHING POLE HOLDER

[76] Inventors: Richard C. Hoffman, 235 Steel St., Unit #4; Reginald W. Holt, 13 Baker Crescent, both of Barrie, Ontario, Canada

[21] Appl. No.: 35,350

[22] Filed: May 2, 1979

[30] Foreign Application Priority Data

Jan. 22, 1979 [CA] Canada .................................. 320015
Apr. 9, 1979 [CA] Canada .................................. 320015

[51] Int. Cl.³ .............................................. A01K 97/10
[52] U.S. Cl. .................................................. 43/21.2
[58] Field of Search ........................... 43/15, 16, 21.2

[56] References Cited

U.S. PATENT DOCUMENTS

| 2,628,443 | 2/1953 | Weckerling | 43/15 |
|---|---|---|---|
| 2,650,052 | 8/1953 | Bintz | 43/21.2 |
| 2,714,270 | 8/1955 | Premo | 43/15 |
| 2,934,849 | 5/1960 | Kampa | 43/21.2 |
| 3,309,808 | 3/1967 | George | 43/15 |
| 3,431,670 | 3/1969 | Harpham | 43/21.2 |

*Primary Examiner*—Nicholas P. Godici
*Assistant Examiner*—K. Bradford Adolphson
*Attorney, Agent, or Firm*—Burns, Doane, Swecker & Mathis

[57] ABSTRACT

A fishing pole holder has a mounting stand and a pivotally mounted pole handle which can be adjusted to change the lever ratio as well as for balance by means of weights. A conventional reel is mounted on the stand and the line is trained over a fulcrum point near the pivot.

4 Claims, 7 Drawing Figures

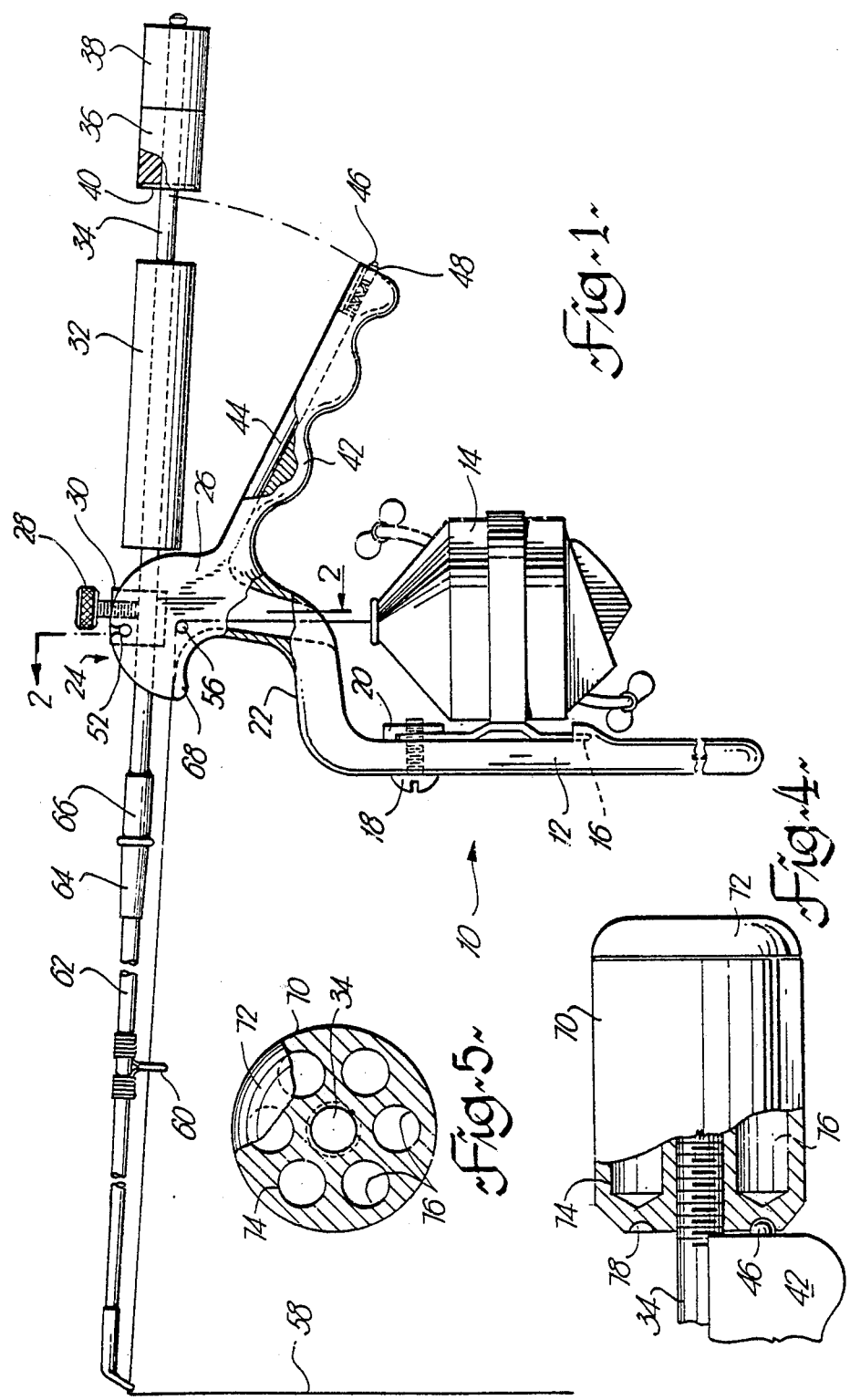

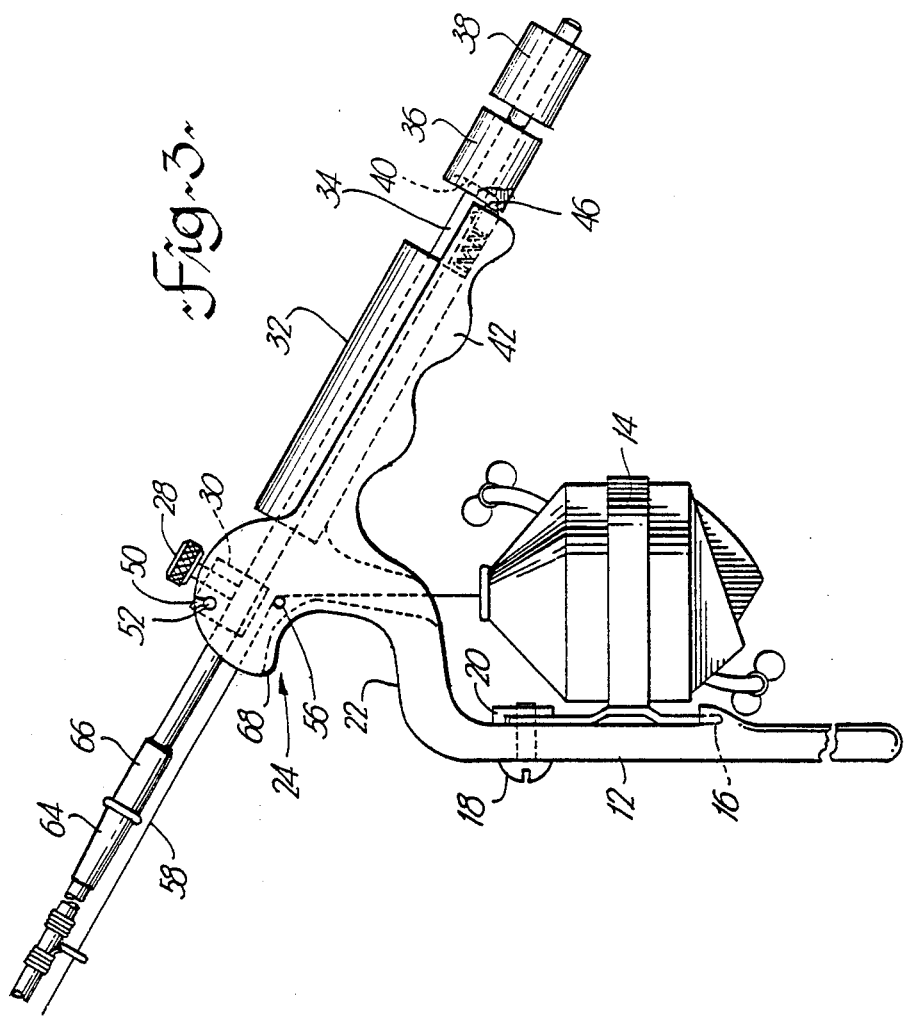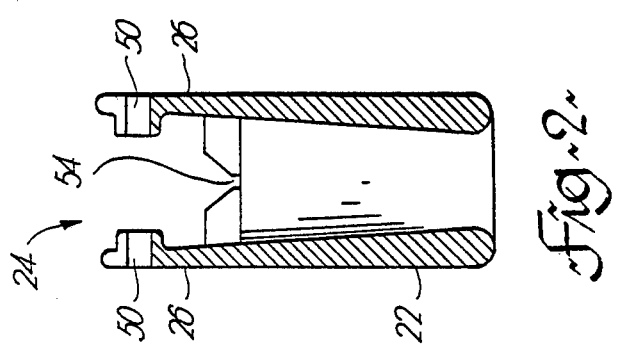

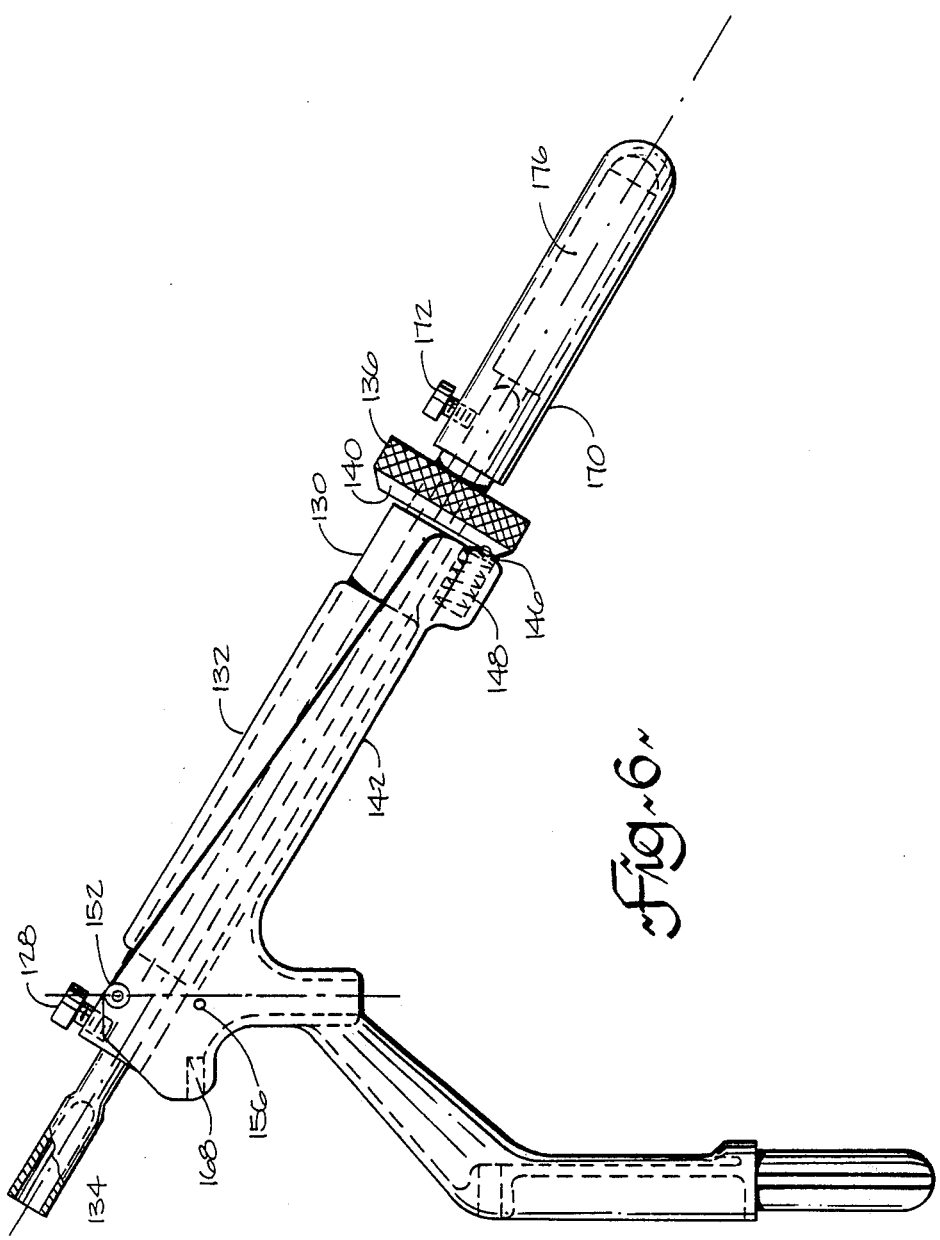

FISHING POLE HOLDER

BACKGROUND OF THE INVENTION

This invention relates to apparatus for use in the sport of fishing and in particular to a holder for a fishing pole or rod which can be used in various aspects of the sport such as ice-fishing, trolling, still-fishing, jigging etc. The apparatus includes a base or handle which is adapted to be mounted in a substantially vertical position in an oar lock or similar retaining device in a boat and the handle also includes a fulcrum therein for the balanced mounting of a pole handle into which a fishing pole of various length can be detachably mounted. The pole handle at the end opposite from the fishing pole is provided with balancing means to compensate for the weight of pole in the holder and the base includes a mounting for a spin cast or a bait cast reel, the line therefrom being trained through the fulcrum of the handle and outwardly through standard eyelets on the pole mounted in the holder. Two balance adjustments are provided on the holder, (a course balance adjustment for various baits and lures to be used by the fisherman and a fine balance adjustment for the trolling or reeling position). A rod pivot stop is also included on the handle so that the hook on the line is set when the pole is pulled downwardly on a catch and bottoms out on the stop. By virtue of its mounting in an oar lock or other circular mounting brackets, the holder will pivot in the direction that a fish runs with the bait or the lure.

SUMMARY OF THE INVENTION

According to a broad aspect, the present invention relates to a fishing pole holder comprising a mounting base shaft, a handle grip and a fulcrum for the balanced mounting therein of a pole handle. The pole handle has means at one end for detachably receiving a fishing rod therein and balance means at the other end of the handle and including means for a detent engagement with the handle grip. The mounting base shaft is adapted to receive a reel thereon and means are provided in the fulcrum for training a fishing line from the reel therethrough and along the rod detachably mounted in the pole handle and means in the fulcrum for balancing the pivotal mounting of the hole handle.

The invention is illustrated by way of example in the accompanying drawings in which:

FIG. 1 is an elevation view of the pole handle assembly in a still-fishing position;

FIG. 2 is a sectional view taken along the lines 2—2 of FIG. 1;

FIG. 3 is a view similar to FIG. 1 but with the assembly in a trolling or reeling position;

FIGS. 4 and 5 are views of a counterweight arrangement for the rod,

FIG. 6 shows another embodiment of the invention in a trolling position, and

DESCRIPTION OF THE PREFERRED EMBODIMENT

Figure 7:
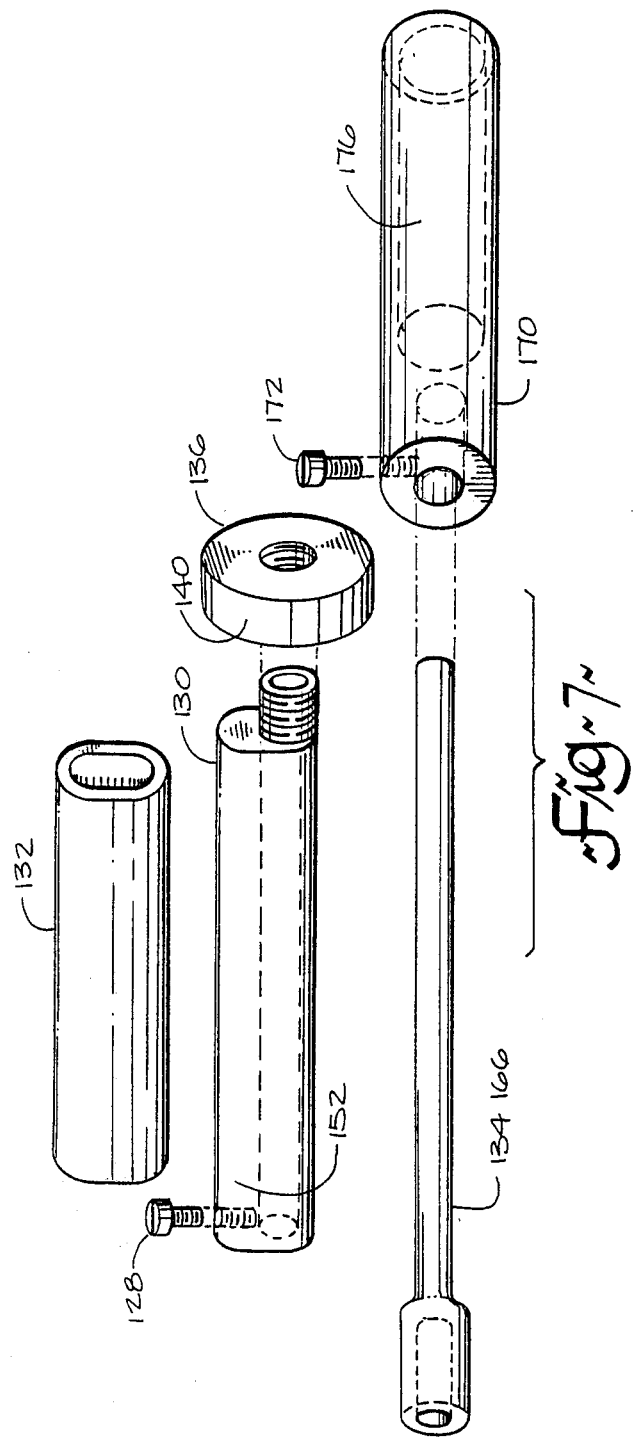
FIG. 7 is an exploded view of the handle and balance weight assembly from the embodiment of FIG. 6.

Referring to FIG. 1, the pole holder indicated generally at 10 comprises a mounting base shaft 12 of a suitable length for placement in a retaining device in a boat such as an oar lock or the like. The mounting shaft 12 or the handle grip 42 may have a reel 14 integrally mounted thereon or, as illustrated, the shaft may include a lip 16 and nut and bolt 18 and 20 for detachably securing a conventional reel to the shaft. As shown in FIG. 1, the shaft 12 has a bent portion 22 leading into a fulcrum 24 having a pair of spaced ears 26 for the pivotal mounting of a course balancing block 30 having a set screw 28 therein and through which is movably positioned the pole handle 32. It will be evident that unscrewing the set screw 28 allows the pole handle 32 to move to the left or to the right within the balance block 30.

The end 34 of the rod is threaded to receive a pair of weights 36 and 38 which provide a fine balance adjustment to compensate for loads applied to the operative end of the fishing rod. Weight 36 is provided with a detent recess 40. A handle grip 42 is angularly positioned with respect to the base shaft 16 and is U-shaped in cross-section for most of its length to provide a trough 44 so as to receive the handle 32 of the pole handle when the holder 10 is placed in a trolling or reeling position as shown in FIG. 3. In this regard, the terminal end of the handle grip 42 is provided with a detent plunger 46 loaded by a spring 48, the plunger 46 being adapted to engage the recess 40 in the fine balance weight 36 when the pole handle 32 is placed in the trolling position of FIG. 3.

In the preferred arrangement shown in FIGS. 4 and 5 a counterweight holder 70 is threaded onto the end of the handle 34 together with a retainer cap 72. Holder 70 is cylindrical in shape and provided with a plurality of chambers 74 each of which may retain a cartridge-shaped weight 76. This arrangement provides a fine balance adjustment to compensate for light loads (short ice-fishing rod) or heavy loads (trolling rod) to the operative end of the fishing rod. Like the counterweight of FIG. 1, holder 70 has an annular detent recess 78. The detent position can be used for still fishing etc., especially when left unattended.

The fulcrum ears 26, as shown in FIG. 2, are provided with slotted apertures 50 for snap-mounting a pivot pin 52 therein on which the block 30 is mounted. The fulcrum 24 is also provided with a guide 54 and which may include a fulcrum pin 56 for guiding a fishing line 58 from the reel 14, through the fulcrum and outwardly through the eyes 60 of the fishing pole 62. As shown in FIG. 1, pole 62 ha a male ferule 64 which is received in a female ferule 66 mounted on the outer end of the pole handle 32. The entire handle assembly can be snapped in or out of the slotted aperture 50 for easy storage and packing.

The fulcrum also includes a lip 68 at the forward end thereof that provides a stop for the pole handle 32 if the pole 62 and handle are drawn downwardly from the still-fishing position of FIG. 1 by a catch or the trolling position of FIG. 3 by a catch. When the pole 62 hits the stop, the hook will be set.

The hook is also set anytime when the handle-pivot 30 and the grip 42 of the rod holder are drawn together without removing the holder from the oar lock or other mounting base.

The trolling or reeling position of the holder is shown in FIG. 3 where the detent plunger 46 is engaged in the recess 40 in the balance weight 36, the handle 32 being nested in the trough of the grip 42.

Referring to FIG. 6, it will be seen that the pole handle 132 is integrally formed with the course balance block 130 which is pivoted to the holder at 152, the block 130 being provided at that end with the set screw 128 for adjustment purposes. In this embodiment, the handle does not slide on the rod 134 whereby the relationship of the handle grip 142 is always the same regardless of changes made in the course balance-handle 130, 132.

The fine balance adjustment comprises a collar having an internal thread adapted to be screwed onto the end of the handle 132 as shown in FIG. 7, the latter having a sponge rubber sleeve provided over its exterior. The fine balance collar 136 is therefore not attached to the rod 134 as in the previous embodiment and this allows the fine balance 136 with its detent recess 140 to be engaged with the detent 146 regardless of the location of the course balance 130 set relative to the rod by set screw 128. As an example, if a large fish is caught, the detent 146 helps to hold the handle and base together and is much easier on the hands of the fisherman.

The counterweight holder is in the form of a cylinder 170 retaining a single counterweight 176 therein and can be omitted when used with a short ice-fishing rod, its' use being helpful on the long trolling rod. It will be noted from FIG. 6 that holder 170 can be adjusted along the end of the rod 134 by a set screw 172.

While the invention has been described in connection with a specific embodiment thereof and in a specific use, various modifications of the invention will occur to those skilled in the art without departing from the spirit and scope of the invention as set forth in the appended claims.

The terms and expressions which have been employed in this specification are used as terms of description and not of limitation and there is no intention in the use of such terms and expressions to exclude any equivalents of the features shown and described or portions thereof, but it is recognized that various modifications are possible within the scope of the invention as claimed.

We claim:

1. A fishing pole holder comprising a mounting base shaft, a handle grip and a fulcrum for the balanced mounting therein of a pole handle; said pole handle having means at one end for detachably receiving a fishing rod; a first balance means for positioning in said fulcrum and for receiving the pole handle therein and a second balance means at the end of the handle remote from said fishing rod and including means for detent engagement with the handle grip of the holder, said mounting base shaft being adapted to receive a reel thereon and means in the fulcrum for guiding fishing line from the reel through said fulcrum and along a rod mounted in said holder.

2. A pole holder according to claim 1 and including a pole stop in said fulcrum.

3. A pole holder according to claim 1 including a fulcrum pin mounted in said fulcrum over which said line is guided.

4. A pole holder according to claim 1, wherein said first balance means includes a balance pivot which allows the fishing line to be pulled by pivoting said fishing rod about said balance pivot by relative movement of said pole handle toward said handle grip.

* * * * *